United States Patent [19]

Caputo et al.

[11] 4,440,024
[45] Apr. 3, 1984

[54] TACHOGENERATOR

[75] Inventors: William R. Caputo, Wyckoff; Jitendra K. Trivedi, West Milford, both of N.J.

[73] Assignee: Westinghouse Electric Corp., Pittsburgh, Pa.

[21] Appl. No.: 411,791

[22] Filed: Aug. 26, 1982

[51] Int. Cl.³ .......................... G01P 1/04; G01P 3/24
[52] U.S. Cl. .......................................... 73/529; 74/209
[58] Field of Search ............... 73/529; 322/31; 74/12, 74/207, 209; 187/23; 254/267; 310/75 C

[56] References Cited

U.S. PATENT DOCUMENTS 2,105,158  1/1938  Pearck et al. ........................ 73/529
4,030,570  6/1977  Caputo ............................. 187/29 R Primary Examiner—Gerald Goldberg
Assistant Examiner—John E. Chapman, Jr.
Attorney, Agent, or Firm—D. R. Lackey

[57] ABSTRACT

A friction driven tachogenerator having a friction drive wheel in contact with a movable member. The tachogenerator is compliantly and frictionlessly mounted, and at least one pressure roller is disposed in tangential, rolling contact with the friction drive wheel. The pressure roller biases the friction wheel against the movable member to provide a predetermined contact pressure between the friction wheel and movable member without applying a significant load to the shaft and bearings of the tachogenerator. The compliant and frictionless mounting of the tachogenerator is devoid of friction sources which can interfere with the sensing of velocity oscillations by the tachogenerator.

7 Claims, 4 Drawing Figures

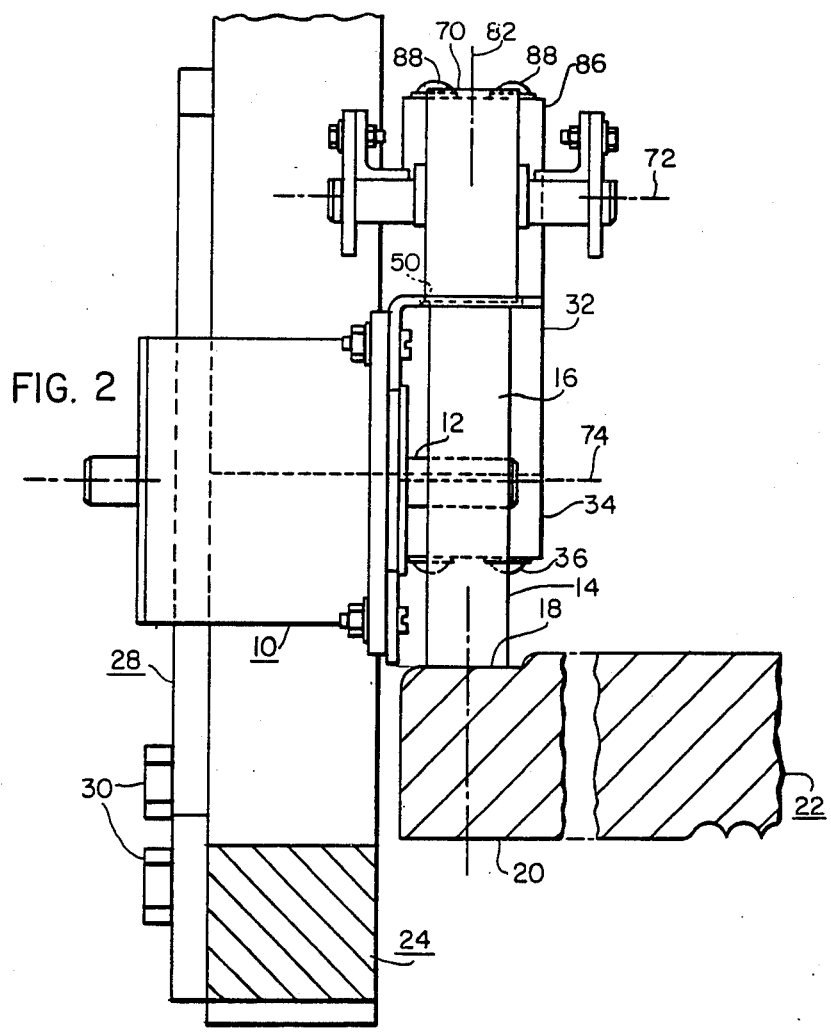
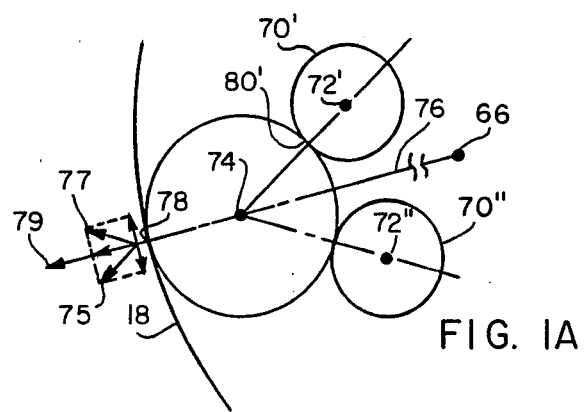

TACHOGENERATOR

BACKGROUND OF THE INVENTION

1. Field of the Invention

The invention relates in general to tachogenerators, and more specifically to friction driven tachogenerators.

2. Description of the Prior Art

U.S. Pat. No. 4,030,570, which is assigned to the same assignee as the present application, discloses a traction elevator system and the importance of developing motor velocity, motor acceleration, and stabilizing feedback signals for the motor control loop which are free of electrical noise. The accelerator signal is used to provide system damping and to significantly reduce oscillations due to the natural, lightly damped, resonance of the mechanical system of discrete masses coupled together with "springy" cables. This is especially important when a solid state dual bridge converter drive is used, because of its fast response and ability to follow noise in a signal. Noise in the signals can cause the mechanical system of the traction elevator to be perturbed and generate an annoying vertical vibration of the elevator car. This patent also discloses that electrical noise can be reduced in the signals by generating them with a high quality tachogenerator having a ripple of less than 2% peak-to-peak, and by friction or rim driving the tachogenerator, eliminating noise due to belts or gears.

With a friction drive, it is important that no slippage occur between the friction wheel and the surface of the movable element which rotates the wheel. To increase the force of the friction wheel against the movable element, special tachogenerators are used which have a larger diameter shaft and heavier duty bearings, than conventional tachogenerators. This special tachogenerator is hinged mounted, with a biasing force being applied to the tachogenerator which in turn biases the friction wheel against the driving surface through the bearings and shaft of the tachogenerator. Recent experience has shown that friction in the hinge can interfere with the ability of the tachogenerator to follow the higher frequency deviations in the velocity while following the steady-state and lower frequencies very accurately. This inability of the tachogenerator to sense the higher frequency velocity components inhibits the desired increase in damping and the elevator ride smoothness is significantly impaired.

It would be desirable to eliminate this frequent maintenance, while providing a friction driven tachogenerator system in which the complete biasing force will always be applied to the friction wheel. In other words, it would be desirable to eliminate friction points which can reduce the percentage of the biasing force which actually ends up at the interface between the friction wheel and the movable driving element. It would also be desirable to accomplish these objectives while reducing the overhung load on the shaft and bearings to the point where standard shaft and bearing arrangements may be used, substantially reducing the cost of the tachogenerator, and also reducing its physical size.

SUMMARY OF THE INVENTION

Briefly, the present invention relates to a new and improved friction driven tachogenerator which is mounted and biased to eliminate intermediate friction points, and to greatly reduce the overhung load on the shaft and bearings. In a preferred embodiment of the invention, the tachogenerator is compliantly and frictionlessly mounted via a flat cantilever spring, adjusted such that the spring supports the entire weight of the tachogenerator, with the friction wheel "floating" just above the movable driving surface. Pressure roller means is biased against the friction wheel to in turn bias the friction wheel against the movable driving surface.

In a preferred embodiment of the invention, the rotational axis of the friction wheel, the contact interface between the friction wheel and the movable driving surface, and resultant force applied by the pressure roller means against the friction wheel, all lie on a common straight line. There are no force absorbing intermediate friction points between the tachogenerator and its mounting support, or between the biasing force and the friction wheel, resulting in the desired contact force being maintained over long periods of time without special maintenance. The biasing force, being applied directly to the friction wheel, over its axial center, instead of indirectly via the bearings and shaft, enable standard tachogenerator construction, flange or foot mounted, to be used, reducing the initial cost of the tachogenerator, as well as its physical size.

BRIEF DESCRIPTION OF THE DRAWINGS

The invention may be better understood, and further advantages and uses thereof more readily apparent, when considered in view of the following detailed description of exemplary embodiments, taken with the accompanying drawings in which:

FIG. 1A is a diagrammatic representation of the arrangement shown in FIG. 1, except modified to illustrate a dual pressure roller embodiment of the invention;

FIG. 2 is a view of the tachogenerator shown in FIG. 1, taken between and in the direction of arrows II—II in FIG. 1.

DESCRIPTION OF THE PREFERRED EMBODIMENT

Figure 1:
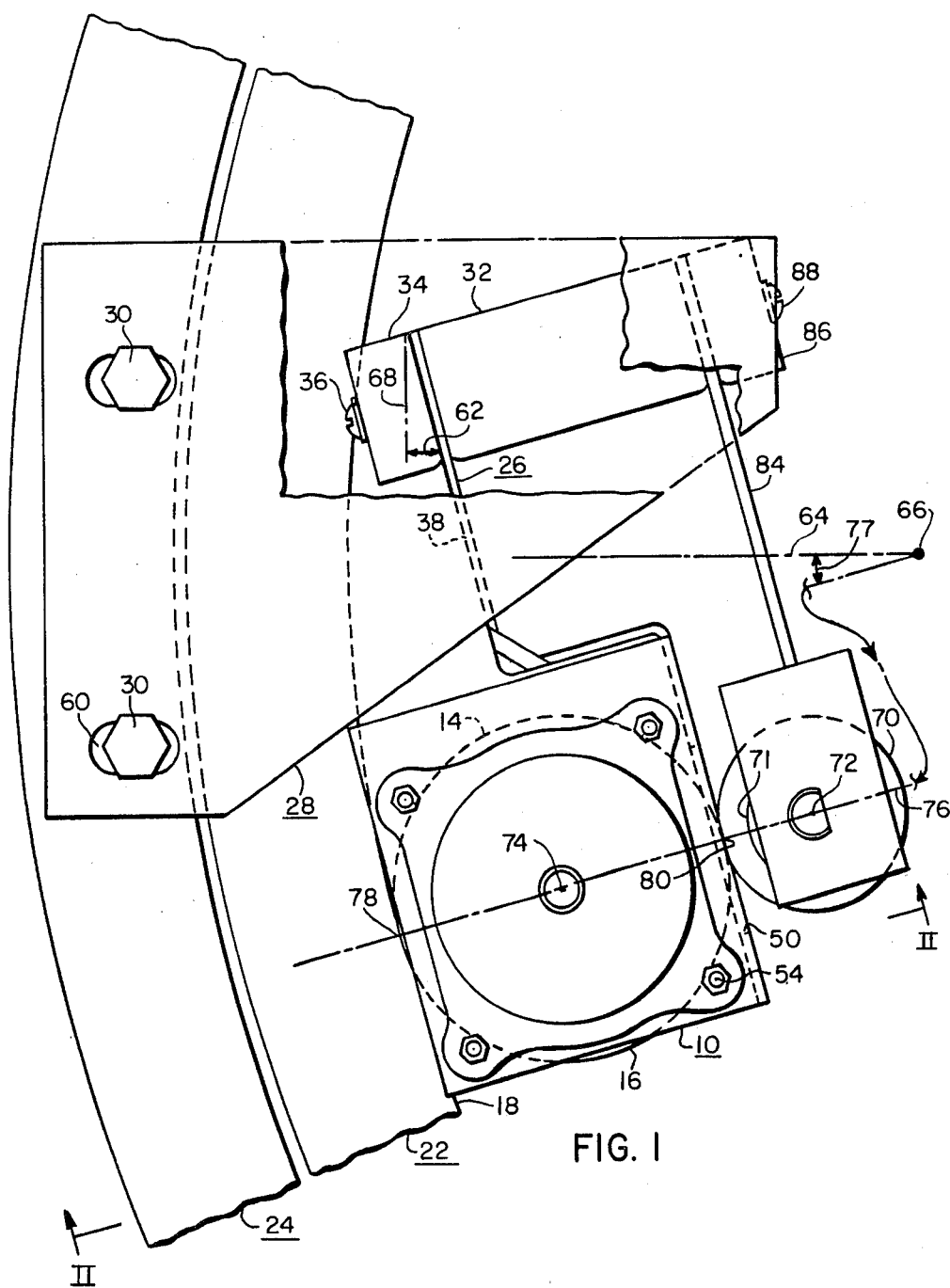
FIG. 1 is an elevational view of a friction driven tachogenerator mounted and biased according to the teachings of the invention.

Referring now to the drawings, there is shown a friction driven tachogenerator 10 having a drive shaft 12 and a friction wheel 14 mounted on the drive shaft 12. For purposes of example, a flange mounted tachogenerator is shown, but a foot mounted unit may be used if desired. At least the outer periphery or surface 16 of friction wheel 14 is formed of a material such as polyurethane, that has a high strength in terms of high abrasion resistance, and a high coefficient of friction.

In order to easily determine the amount of the biasing force to be applied to the friction wheel 14 to achieve a predetermined contact pressure between the wheel 14 and the driving surface 18, tachogenerator 10 is preferably mounted such that, in the absence of the biasing force, the friction wheel 14 would be spaced from the driving surface 18 by some small predetermined dimension, such as 1/16 inch. Thus, it will be known that the tachogenerator mounting arrangement adds no unknown force to the biasing force.

For purposes of example, the movable driving surface 18 will be assumed to be the circular inner periphery of the brake wheel portion 20 of the traction drive sheave 22 of a traction elevator system. The inner periphery or surface is selected merely because of space constraints. The outer periphery or surface would be just as suitable from a functional viewpoint. The outboard bearing support ring 24 for supporting the shaft which drives the traction sheave provides a convenient stationary member for mounting the tachogenerator 10.

In order to eliminate friction points, such as hinges and the problem of friction buildup and side play, a preferred compliant and frictionless mounting arrangement for the tachogenerator 10 includes a flat cantilever spring 26 having a first end which is firmly clamped in a stationary clamping arrangement, and a second end formed to support the tachogenerator 10. In the exemplary embodiment set forth in the figures, a relatively thick support or mounting plate 28, such as a plate formed of 0.375 inch thick steel, is fixed to support ring 24. Suitable fasteners such as hexhead machine screws 30 may be used. A steel mounting block 32 having appropriately rounded corners is properly oriented and positioned on support plate 28 and it is then welded to the support plate in the desired position. Block 32 is drilled and tapped, and a cooperative block 34, also having appropriately rounded corners, is provided which is drilled to receive suitable fasteners, such as machine screws 36. Flat spring 26 has its first end firmly clamped between blocks 32 and 34, extending outwardly therefrom past the rounded corners.

Figure 3:
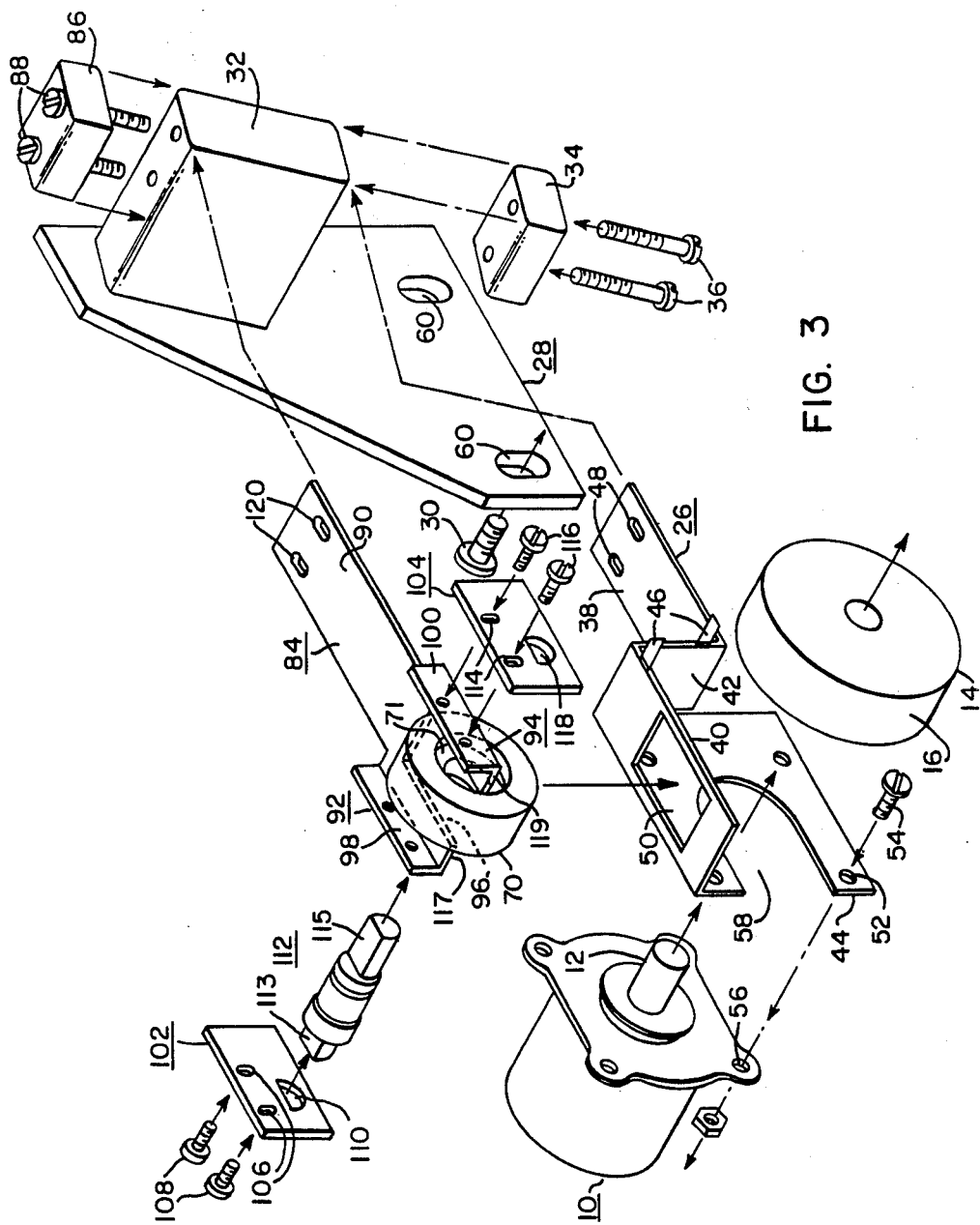
FIG. 3 is an exploded perspective view of the tachogenerator shown in FIGS. 1 and 2.

Flat spring 26 is formed from a flat sheet of steel. It is cut to the desired shape and then bent to form a mounting bracket for tachogenerator 10. As best shown in FIG. 3, for a flange mounted tachogenerator it is bent into a Z-shaped configuration having first and second parallel portions 38 and 40, respectively, which are connected by an intermediate portion 42. An integral portion of the second portion 40 is bent in the direction of the intermediate portion 42 to form a mounting plate 44 for the tachogenerator 10. Plate 44 is welded to the intermediate portion 42, and gussets 46 are welded across the angles formed between the legs of the Z-shaped configuration. Openings 48 are formed in first portion 38 for receiving screws 36, an elongated opening 50 is provided in the second portion 40 for purposes to be hereinafter explained, and openings 52 are provided in mounting plate 44 for receiving screws 54 which engage tapped openings 56 in the mounting surface of tachogenerator 10. An opening 58 extends inwardly from one side of mounting plate 44, for receiving drive shaft 12 after the friction wheel 14 has been attached.

Mounting plate 28 has slotted openings 60 for receiving screws 30, and the mounting plate is adjusted via these openings such that friction wheel 14 is spaced a predetermined small dimension, such as 1/16 inch, from surface 18. Portion 38 functions as a flat cantilever spring, which supports the weight of tachogenerator 10, and thus free floats the tachogenerator.

Spring portion 38 is dimensioned to provide a predetermined unit deflection C. In a load-deflection graph for the spring, the unit deflection C is defined as the tangent of the angle the load-deflection line for the spring makes with the ordinate of the graph. The force P applied to the spring is on the ordinate of the graph, and the deflection F is on the abscissa. The stiffer the spring, the lower the unit deflection C. The load-deflection line should be linear over the operating range of the spring.

It will be noted from FIG. 1 that the bending force applied to spring portion 38 by the tachogenerator 10 may be selected to be a relatively small value by proper selection of the mounting angle 62. Broken line 64 shown in FIG. 1 is a horizontal line disposed through the rotational axis 66 of the sheave 22. The active portion 38 of the spring 26 is approximately bisected by line 64, with angle 62 being a predetermined small angle from the vertical, indicated by broken line 68. A small angle such as 15° has been found to be suitable. However, it is to be understood that many different mounting angles may be used, with the angle being selected according to the characteristics of the spring used, and how much stress it is desired that the spring be subjected to during operation.

Pressure roller means, having at least pressure roller 70, is mounted and biased to cause the friction wheel 14 to be pressed against surface 18 with the desired contact pressure. Pressure roller 70, which includes a suitable antifriction bearing 71, is located such that its rotational axis 72 is parallel with the rotational axis 74 of the friction wheel 14. In a preferred embodiment, best shown in FIG. 1, pressure roller 70 is mounted such that a line 76 which intersects both rotational axes, also intersects the rotational axis 66 of the sheave 22. The angle which broken line 76 makes with broken line 64, indicated in FIG. 1 as angle 77, is the same as angle 62 formed between the flat spring 26 and the vertical line 68. Line 76 will also intersect the contact interface 78 between the friction wheel 14 and surface 18, and the contact interface 80 between the friction wheel 14 and pressure roller 70. This is a preferred embodiment because it is highly efficient. However, as shown in FIG. 1A, the pressure roller means may include more than one pressure roller, such as a pair of pressure rollers 70' and 70''. Equally spacing rollers 70' and 70'' on opposite sides of line 76 would also provide a highly efficient arrangement. Less efficient arrangements, but functional, include a single roller arranged such that its contact point 80 does not lie on a line drawn through point 78 and center 74, and a pair of rollers arranged such that the resultant of their forces does not lie on this line. In the arrangement of FIG. 1A, rollers 70' and 70'' apply forces 75 and 77, respectively, the resultant 79 of which is oriented along a line which extends between axis 74 and contact interface 78. Pressure roller 70 makes contact with the friction wheel 14 through the opening 50 in the second portion 40 of the Z-shaped configuration of the spring 26. The outer peripheries of the friction wheel 14 and the pressure roller 70 are in tangential, rolling contact, with the surfaces, in an axial direction, being centered about a flat plane 82 disposed perpendicular to the rotational axes 72 and 74.

A suitable mounting and biasing arrangement for pressure roller 70 is shown in the figures, wherein a flat cantilever spring 84 is also used to mount the pressure roller 70. The flat cantilever spring 84 has a first end which may be clamped to the end of block 32 which is opposite to the end which functions in the clamping arrangement for the spring 26. A block 86, having appropriately rounded corners, and screws 88 may be used to complete the clamping function for spring 84. Spring 84 has a second end which is configured to support the pressure roller 70. For example, spring 84 may be formed from a sheet of steel, into a generally Y-shaped configuration having a stem portion 90, first and second arm portions 92 and 94, and a spacing 96 between the arm portions. The arm portions 92 and 94 are each bent to provide side portions 98 and 100, respectively, which are drilled and tapped. Side plates 102 and 104 are attached to side portions 98 and 100, respectively. For example, side plate 102 has openings 106 for receiving screws 108, and an opening 110 for supporting one end of a dead shaft 112. Shaft 112 includes flat portions 113 and 115 adjacent its ends. In like manner, side plate 104 has openings 114 for receiving screws 116, and an opening 118 for receiving the other end of the dead shaft 112. Arm portions 92 and 94 include surfaces 117 and 119 which contact flat portions 113 and 115, respectively, of shaft 112, when assembled.

In the assembly of the pressure roller 70, shaft 112 is inserted into an opening in bearing 71 of the pressure roller 70, and the side plates 102 and 104 are assembled on the ends of the shaft 112. The side plates 102 and 104 are then fastened to the upstanding side portions 98 and 100 via screws 108 and 116, respectively. The first end of spring 84 includes openings 120 for receiving screws 88.

Block 32 is dimensioned between its clamping ends to provide the desired deflection of spring 84 when screws 88 are tightened to cause pressure roller 70 to contact and apply pressure to the friction wheel 14. Spring 84 is selected to have a substantially lower unit deflection C than spring portion 38, to enable spring 84 to overcome the resistance of spring 38 and move wheel 14 tightly against surface 18 with the desired pressure. The different unit deflections may be obtained by constructing the springs 38 and 84 from sheets of steel having different thickness dimensions. For example, if spring 38 is formed of 0.090 inch thick material, spring 84 may be formed of 0.125 inch thick material. If the dimensions of the two springs are otherwise the same, the thinner spring will have about 2.67 times the deflection of the thicker spring for the same force applied to the outer end of the spring. The following formula for flat cantilever springs may be used to develop the desired information:

$$F = 4PL^3 / Ebt^3$$

Where F is the deflection of the unclamped end in inches, P is the force at the end of the spring in pounds, L is the length of the spring in inches, from the clamping point to the outer end of the spring, b is the width of the spring in inches, t is the thickness dimension of the spring in inches, and E is the modulus of elasticity of the material used, in pounds per square inch. Knowing the force P that is is desired to be applied to the friction wheel, and the dimensions of the spring, the deflection F can be determined. Deflection F is selectively adjusted by sliding mounting plate 28 in slots 60, and tightening bolts 30 when the desired deflection is achieved.

In summary, there has been disclosed a new and improved friction driven tachogenerator which is compliantly and frictionlessly mounted to enable the tachogenerator to accurately follow velocity deviations, including high frequency deviations. The tachogenerator is easy to adjust in order to obtain the desired contact pressure of the friction wheel against the movable driving element, and once adjusted, will maintain the desired pressure substantially constant over long periods of time, with little or no maintenance. Further, the pressure of the friction wheel is obtained without generating a large overhung load on the shaft and bearings of the tachogenerator, enabling standard shaft and bearing arrangements to be used.

We claim as our invention:

1. In a tachogenerator having a bearing mounted drive shaft, and a friction drive wheel on the drive shaft driven by a movable surface, the improvement comprising:
    means compliantly and frictionlessly mounting the tachogenerator,
    at least one pressure roller means, said pressure roller means including a pressure roller in tangential, rolling contact with the friction wheel.
    and means biasing said at least one pressure roller against the friction wheel, and the friction wheel against the movable drive surface, to provide the desired friction wheel contact pressure against the movable surface without excessively loading the shaft and bearings of the tachogenerator.

2. The tachogenerator of claim 1 wherein the compliant mounting means for the tachogenerator includes a cantilever spring.

3. The tachogenerator of claim 2 wherein the means biasing the pressure roller against the friction wheel is a second cantilever spring having a lower unit deflection than the cantilever spring of the compliant tachogenerator mounting means.

4. The tachogenerator of claim 1 wherein the means which compliantly mounts the tachogenerator has a predetermined stress therein, which, in the absence of the pressure roller means, would space the friction wheel from the movable surface by a predetermined dimension, to free-float the tachogenerator via the compliant mounting means and cause the pressure roller means and biasing means to provide the major portion of the force applied by the friction wheel to the movable surface.

5. The tachogenerator of claim 1 wherein the pressure roller means is arranged such that the resultant force applied by the pressure roller means to the friction wheel acts substantially along a line which intersects the rotational axis of the friction wheel and the contact interface between the friction wheel and the movable surface.

6. The tachogenerator of claim 1 wherein the movable surface is circular in configuration, and wherein the pressure roller means is arranged such that the resultant force applied by the pressure roller means to the friction wheel acts substantially along a line which intersects the rotational axis of the friction wheel and the center of the circular, movable surface.

7. A friction driven tachogenerator, comprising:
    a rotatable member whose angular velocity is to be measured,
    a stationary member disposed adjacent to said rotatable member,
    a tachogenerator having a drive shaft,
    a friction drive wheel on said drive shaft,
    a pressure roller,
    first and second cantilever springs having first ends fixed to said stationary member, and second ends compliantly and frictionlessly supporting said tachogenerator and said pressure roller, respectively,
    said first cantilever spring having a higher unit deflection than said second cantilever spring, with the first cantilever spring, in the absence of said second cantilever spring, being selected and positioned to free-float the tachogenerator with said friction wheel spaced a predetermined dimension from the rotatable element, and with the second cantilever spring being selected and positioned to cause the pressure roller to bias the friction wheel against the rotatable member with a predetermined force line which passes through the contact interface between the rotatable member and the friction drive wheel, and through the rotational axes of the friction drive wheel, the pressure roller, and the rotatable member.

* * * * *